United States Patent [19]

Shioya et al.

[11] Patent Number: 6,034,144

[45] Date of Patent: Mar. 7, 2000

[54] MOLDED ARTICLE OF FOAMED AND EXPANDED BEADS OF PROPYLENE RESIN

[75] Inventors: Satoru Shioya, Kawachi-gun; Akinobu Hira, Utsunomiya; Hidehiro Sasaki, Kawachi-gun; Hisao Tokoro, Utsunomiya, all of Japan

[73] Assignee: JSP Corporation, Tokyo, Japan

[21] Appl. No.: 09/329,363

[22] Filed: Jun. 10, 1999

[30] Foreign Application Priority Data

Jun. 11, 1998 [JP] Japan .................................. 10-179664

[51] Int. Cl.[7] .................................. C08J 9/24; C08J 9/232
[52] U.S. Cl. .................................. 521/60; 264/DIG. 15; 264/DIG. 16; 521/56; 521/58
[58] Field of Search .................................. 521/60, 56, 58; 264/DIG. 15, DIG. 16

[56] References Cited

U.S. PATENT DOCUMENTS

| | | |
|---|---|---|
| Re. 32,780 | 11/1988 | Yoshimura et al. . |
| 4,379,859 | 4/1983 | Hirosawa et al. . |
| 4,436,840 | 3/1984 | Akiyama et al. . |
| 4,440,703 | 4/1984 | Akiyama et al. . |
| 4,443,393 | 4/1984 | Akiyama et al. . |
| 4,464,484 | 8/1984 | Yoshimura et al. . |
| 4,504,534 | 3/1985 | Adachi et al. . |
| 4,504,601 | 3/1985 | Kuwabara et al. . |
| 4,567,208 | 1/1986 | Kuwabara et al. . |
| 4,568,608 | 2/1986 | Kuwabara et al. . |
| 4,587,270 | 5/1986 | Kuwabara et al. . |
| 4,598,001 | 7/1986 | Watanabe et al. . |
| 4,602,082 | 7/1986 | Akiyama et al. . |
| 4,676,939 | 6/1987 | Kuwabara . |
| 4,692,507 | 9/1987 | Akiyama et al. . |
| 4,695,593 | 9/1987 | Kuwabara et al. . |
| 4,704,239 | 11/1987 | Yoshimura et al. . |
| 4,711,287 | 12/1987 | Kuwabara et al. . |
| 4,716,021 | 12/1987 | Akiyama et al. . |
| 4,749,725 | 6/1988 | Akiyama et al. . |
| 4,756,948 | 7/1988 | Kuramochi et al. . |
| 4,777,000 | 10/1988 | Kuwabara et al. . |
| 4,822,542 | 4/1989 | Kuwabara et al. . |
| 4,840,973 | 6/1989 | Kuwabara et al. . |
| 4,889,671 | 12/1989 | Akiyama et al. . |
| 4,948,817 | 8/1990 | Kuwabara et al. . |
| 5,053,435 | 10/1991 | Kuwabara et al. . |
| 5,071,883 | 12/1991 | Kuwabara et al. . |
| 5,084,814 | 1/1992 | Vaglica et al. . |
| 5,122,545 | 6/1992 | Kuwabara et al. . |
| 5,130,341 | 7/1992 | Kuwabara et al. . |
| 5,284,431 | 2/1994 | Kuwabara et al. . |
| 5,340,841 | 8/1994 | Tokoro et al. . |
| 5,391,581 | 2/1995 | Kuwabara et al. . |
| 5,459,169 | 10/1995 | Tokoro et al. . |
| 5,569,681 | 10/1996 | Tokoro et al. . |
| 5,622,756 | 4/1997 | Tokoro et al. . |
| 5,651,912 | 7/1997 | Mitsumoto et al. . |
| 5,679,450 | 10/1997 | Tokoro et al. . |
| 5,747,549 | 5/1998 | Tsurugai et al. . |

FOREIGN PATENT DOCUMENTS

| | | |
|---|---|---|
| 0068467 | 1/1983 | European Pat. Off. . |
| 0071981 | 2/1983 | European Pat. Off. . |
| 10176077 | 6/1980 | Japan . |
| 59-043493 | 10/1984 | Japan . |
| 60-252636 | 12/1985 | Japan . |
| 61-004738 | 1/1986 | Japan . |
| 62-033253 | 7/1987 | Japan . |
| 4372630 | 12/1992 | Japan . |

*Primary Examiner*—Morton Foelak

[57] ABSTRACT

Disclosed herein is an molded article of foamed and expanded beads of a propylene resin, which is obtained by heating and molding the foamed beads of the propylene resin, wherein the apparent density of the molded article is 0.11 to 0.45 g/cm$^3$, a value obtained by dividing its maximum bending strength (kgf/cm$^2$) determined in accordance with JIS K 7221 by the apparent density (g/cm$^3$) is at least 160 (kgf/cm$^2$)/(g/cm$^3$), and the average number of cells at its section is within a range of 5 to 100 cells/mm$^2$.

15 Claims, 1 Drawing Sheet

MOLDED ARTICLE OF FOAMED AND EXPANDED BEADS OF PROPYLENE RESIN

BACKGROUND OF THE INVENTION

1. Field of the Invention

The present invention relates to a molded article of foamed and expanded beads of a propylene resin, which has excellent mechanical strength and a low expansion ratio.

2. Description of the Background Art

Molded articles of foamed and expanded beads (hereinafter referred to as "foamed beads" merely) of a propylene resin, which are obtained by heating and molding the foamed beads of the propylene resin in a mold, are widely used in various fields. In recent years in particular, molded articles of foamed beads (hereinafter referred to as the "expansion-molded articles"), which have a relatively low expansion ratio of about 2 to 8 times, have been expected to be in demand in fields required to be thin-wall and have high stiffness and energy absorption performance. There is a possibility that they may be widely used in fields of application of, for example, cores for integrally molded articles with a skin, such as automotive door panels, pillars and instrument panels, jack and tool housings, etc.

There have heretofore been known foamed beads of propylene resins having a relatively low expansion ratio and molded articles obtained by using such foamed beads. For example, Example 1 of Japanese Patent Publication No. 43493/1984 describes the fact that foamed beads of a polypropylene resin having an apparent expansion ratio of 5 times (apparent density: about 0.18 g/cm$^3$) were molded in a mold to obtain a molded article which had good fusion-bonded state and appearance and was free of shrinkage. Example 2 of Japanese Patent Publication No. 33253/1987 describes the fact that foamed beads of a polypropylene resin having an expansion ratio of 5 times were charged into a mold and molded therein to obtain a molded article having high mechanical strength. Japanese Patent Application Laid-Open No. 4738/1986 describes a process for producing foamed beads of a polypropylene resin, which are used for expansion molding, and Run Nos. 1, 5 and 6 in Table 3 of this publication show examples where foamed beads of the polypropylene resin having bulk expansion ratios of 5 times (apparent density: about 0.270 g/cm$^3$), 3 times (apparent density: about 0.450 g/cm$^3$) and 7 times (apparent density: about 0.193 g/cM$^3$), respectively, were produced. Incidentally, the bulk expansion ratio is a value determined by placing a plurality of the foamed beads in a graduated cylinder, dividing the weight of the foamed beads by a volume read by the graduated cylinder at this time to find a bulk density (g/cm$^3$) of the foamed beads, and dividing the density (g/cm$^3$) of the base resin of the foamed beads by the thus-found bulk density of the foamed beads.

Further, Example 5 of Japanese Patent Application Laid-Open No. 372630/1992 describes the fact that a propylene resin was used to obtain foamed beads having an expansion ratio of 2.6 cm$^3$/g (apparent density: about 0.385 g/cm$^3$). Example 1 of Japanese Patent Application Laid-Open No. 176077/1998 describes the fact that foamed beads of a propylene resin having an average expansion ration as low as 3.6 times (apparent density: about 0.250 g/cm$^3$) were obtained.

However, Japanese Patent Publication No. 43493/1984, Japanese Patent Publication No. 33253/1987 and Japanese Patent Application Laid-Open No. 4738/1986 do not describe anything about the fact that a molded article, wherein a value (hereinafter may be referred to as the "ratio of the bending strength to the density" merely) obtained by dividing its maximum bending strength (kgf/cm$^2$) determined in accordance with JIS K 7221 by its apparent density (g/cm$^3$) is at least 155 (kgf/cm$^2$)/(g/cm$^3$), is obtained. Moreover, it has been hard to say that when such foamed beads having a low expansion ratio as described in these publications are molded to use the resultant molded articles as such cores for integrally molded articles with a skin, and jack and tool housings as described above, their strength is sufficient. The foamed beads having an expansion ratio of 2.6 cm$^3$/g described in Example 5 of Japanese Patent Application Laid-Open No. 372630/1992 are further expanded to provide foamed beads having an expansion ration of 13.56 cm$^3$/g (apparent density: about 0.074 g/cm$^3$). Therefore, the foamed beads are not those used for obtaining expansion-molded articles having a low expansion ratio. The foamed beads having a relatively low average expansion ratio of 1.5 to 4.7 times described in Japanese Patent Application Laid-Open No. 176077/1998 are also further expanded to provide foamed beads having an apparent density lower than 0.11 g/cm$^3$, and the foamed beads thus provided are then molded. Therefore, the expansion-molded articles described in Japanese Patent Application Laid-Open No. 176077/1998 are also different from the expansion-molded article of the propylene resin having a low expansion ratio that the present invention has as its object the provision thereof.

When resin particles are expanded, the expansion ratio of the resulting foamed beads becomes lower as the pressure of a foaming agent fed into a vessel in which the resin particles have been dispersed into dispersion medium is lower (the amount of the foaming agent is less). However, foamed beads of a propylene resin having low expansion ratio obtained in such a manner involve problem that the expandability and fusion bonding property upon the molding of the foamed beads become more deteriorated as the expansion ratio is lower. As a result, the appearance of the resulting molded article is deteriorated, and moreover it is impossible to obtain an excellent expansion-molded article in which good physical properties such as stiffness, that a foam having a low expansion ratio has, have been sufficiently introduced.

SUMMARY OF THE INVENTION

Therefore, the present inventors have carried out an investigation as to the reasons why the expansion-molded articles having excellent strength that the present inventors have as their object the provision thereof are hard to be provided from such foamed beads having a low expansion ratio as described in Japanese Patent Publication Nos. 43493/1984 and 33253/1987, Japanese Patent Application Laid-Open No. 4738/1986, etc. As a result, the following facts have been found. When the conventional foamed beads of the propylene resin having a low expansion ratio are provided, a volatile foaming agent such as dichlorodifluoromethane is used. When such a volatile foaming agent is used, a variation of expansion ratio among individual foamed beads in a group of the resulting foamed beads (a set of foamed beads may hereinafter be referred to as a "group of foamed beads") becomes wider as it is intended to obtain foamed beads of a propylene resin having a lower expansion ratio. When it is intended to provide foamed beads having an apparent density of about 0.18 to 0.64 g/cm$^3$ in particular, there are offered such problems as some particles which have substantially not been expanded are mixed in a group of the resultant foamed beads. When the foamed beads of such a group of the foamed beads are used in molding, secondary expandability and fusion bonding property upon molding become insufficient, which causes a problem that a molded article of the foamed beads, which is excellent in physical properties such as stiffness, is hard to be provided though the molding is conducted with the foamed beads having a low expansion ratio. Therefore, the present inventors have carried out an investigation as to molding of foamed beads of a group of foamed beads, in which a variation of apparent density among individual foamed beads is narrow, and made a further extensive study. As a result, it has been found that a molded article obtained by using foamed beads of a group of foamed beads, in which a variation of apparent density is narrow, and moreover the average number of cells at the section of the foamed bead is within a specific range, wherein the ratio of the bending strength to the density in the molded article is not lower than a specific value, and the average number of cells at its section is within a specific range, can solve the above-described problems, thus leading to completion of the present invention.

According to the present invention, there is thus provided an expansion-molded article of a propylene resin, which is obtained by heating and molding the foamed beads of the propylene resin, wherein the apparent density of the molded article is 0.11 to 0.45 g/cm$^3$, a value obtained by dividing its maximum bending strength (kgf/cm$^2$) determined in accordance with JIS K 7221 by the apparent density (g/cm$^3$) is at least 155 (kgf/cm$^2$)/(g/cm$^3$), and the average number of cells at its section is within a range of 5 to 100 cells/mm$^2$.

The above and other objects, features and advantages of the present invention will be readily appreciated as the same becomes better understood from the preferred embodiments of the present invention, which will be described subsequently in detail with reference to the accompanying drawing, and from the appended claims.

DETAILED DESCRIPTION OF THE PREFERRED EMBODIMENTS

Figure 1:
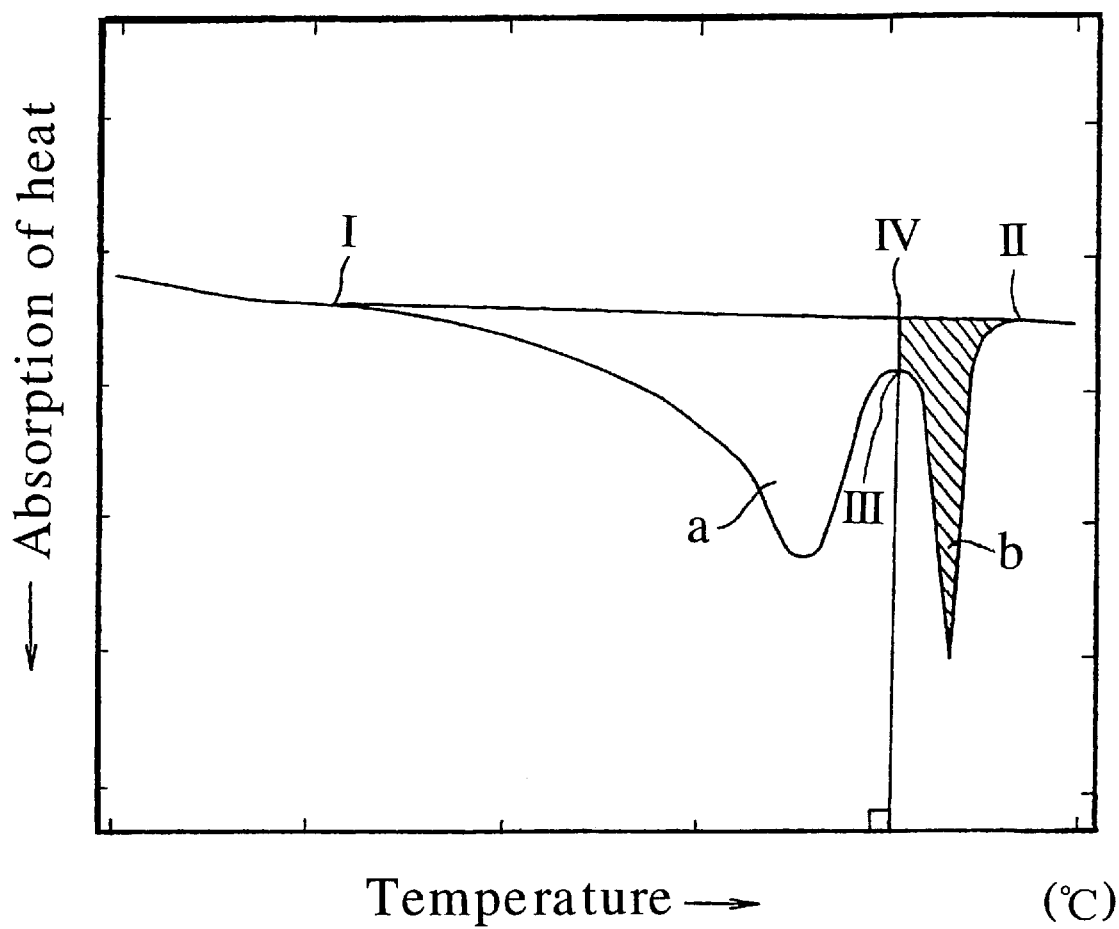
FIG. 1 illustrates the method for determining the quantity of heat at an endothermic peak on the higher-temperature side of foamed beads or a molded article of the foamed beads.

Examples of the base resin of the foamed beads of the propylene resin used in obtaining the expansion-molded article according to the present invention include propylene resins such as a propylene homopolymer, ethylene-propylene random copolymers, ethylene-propylene block copolymers, propylene-butene random copolymers and ethylene-propylene-butene random terpolymers. The propylene copolymers and terpolymers are preferably those containing a propylene component in a proportion of at least 70 wt. %. The above-described propylene resins may be used either singly or in any combination thereof. Of these, the ethylene-propylene random copolymers, propylene-butene random copolymers and ethylene-propylene-butene random terpolymers are preferred because it is easy to control an expansion ratio.

As the base resin of the foamed beads, other polymers may be used in combination with the propylene resin so far as no detrimental influence is thereby imposed on the object of the present invention. Examples of such a polymer include polyethylene resins, polystyrene resins, ethylene-propylene rubber, ethylene-butene rubber, ethylene-octene rubber, propylene-butene rubber and styrene-butadiene-styrene copolymers. At least two of these polymers may be used in combination with the propylene resin.

As a group of foamed beads for obtaining the expansion-molded article according to the present invention, may be used a group of foamed beads whose apparent density is a specific average density selected from a range of about 0.18 to 0.64 g/cm$^3$, whose variation of apparent density among foamed beads making up the group of foamed beads is narrow, and whose average number of cells at the section of the bead is 5 to 100 cells/mm$^2$. Foamed beads whose standard deviation of apparent density is smaller than 0.07 (g/cm$^3$), and whose average number of cells is 10 to 70 cells/mm$^2$ are preferably used.

If the apparent density of the foamed beads is lower than 0.18 g/cm$^3$, there is a possibility that any molded article obtained from such foamed beads may have insufficient stiffness. If the apparent density exceeds 0.64 g/cm$^3$ on the other hand, it is difficult to control the average number of cells of such foamed beads and of any molded article obtained from the foamed beads within the range of 5 to 100 cells/mm$^2$. If a variation of apparent density becomes wide, the ratio of the bending strength to the density in the resulting molded article becomes low, and there is a possibility that the density may vary with the individual molded articles obtained from such foamed beads and with portions of one molded article, or that the appearance and physical properties of the resulting molded article may be deteriorated. In the expansion-molded article according to the present invention, its ratio of the bending strength to the density may be at least 155 (kgf/cm$^2$)/(g/cm$^3$), preferably at least 180 (kgf/cm$^2$)/(g/cm$^3$) for uses as a housing and the like. In the case of an expansion-molded article whose thickness is thin, the ratio of the bending strength to the density is preferably at least 200 (kgf/cm$^2$)/(g/cm$^3$). When foamed beads whose variation of apparent density is so narrow that the standard deviation of the apparent density is smaller than 0.07 (g/cm$^3$) are used in molding, the ratio of the bending strength to the density in the resulting molded article can be controlled to at least 200 (kgf/cm$^2$)/(g/cm$^3$).

Resin particles for the production of the foamed beads used in the present invention can be obtained by melting a resin in an extruder, extruding the molten resin from the extruder into a strand and cutting the strand (this process will hereinafter be referred to as the "extruded strand cutting system"). The weight of the resin particle involves no problem so far as it is about 0.1 to 40 mg. However, in view of the filling ability of foamed beads obtained by expanding the resin particles into a mold upon molding of the foamed beads, it is preferred that the weight of the resin particle be controlled to 0.1 to 6 mg. When the resin particles are produced by the above-described process, it is desirable that a variation of weight among particles be as narrow as possible.

The average cell diameter of the foamed beads used in the present invention is 100 to 230 $\mu$m, preferably 130 to 200 $\mu$m. The cell structure at a section obtained by cutting the foamed bead into halves is preferably a structure that cells uniform in cell diameter are distributed, or that cells having an average cell diameter of 15 to 130 $\mu$m are present in the surface layer portion within a range of from the surface of the bead to 50–250 $\mu$m, and cells having an average cell diameter of 150 to 400 $\mu$m are present in the inner layer portion thereof. The foamed beads of the above-described cell structure are high in expandability and fusion bonding property upon heating and molding of the foamed beads in a mold. In particular, the foamed beads having the above-described cell structure that the cells present in the surface layer portion are smaller than the cells present on the side of the inner layer portion are still higher in fusion bonding property upon their molding.

The average cell diameter of the foamed beads are determined by drawing, on the above-described section obtained by cutting each foamed bead into halves, a straight line that passes through the center of the section and traverses the section, and counting the number of cells present on the straight length. A value obtained by dividing the length of the straight line by the number of cells present on the straight line is regarded as the average cell diameter. The average cell diameters of cells present in the surface layer portion and on the side of the inner layer portion are determined by drawing a straight line in the above-described manner, measuring the lengths of straight line portions and the numbers of cells respectively corresponding to the surface layer portion and the inner layer portion and dividing the length of each straight line portion by the number of cells present on such a straight line portion.

A variation of weight in the resin particles used in expansion forms the cause of a variation of apparent density in foamed beads obtained from the resin particles. Accordingly, a condition for narrowing the variation of apparent density in the resulting foamed beads is to select resin particles narrow in the variation of weight as the resin particles used in the expansion. In order to narrow the variation of weight of the resin particles, it is only necessary to provide resin particles by adopting a process comprising selecting such a die that a molten resin uniformly flows into each resin extrusion orifice of the die upon the formation of resin particles by the extruded strand cutting system, controlling extrusion conditions in such a manner that a die pressure becomes constant, taking up each strand extruded from the die under uniform tension and at a uniform speed, fully cooling the strand and then cutting the strand. In this case, It is preferred that defective resin particles produced for causes such as cutting failure of the strand be removed by screening or the like before the resultant resin particles are used in expansion. It is also preferred that the resin particles be provided under such die design, extrusion conditions and take-up conditions that the shape of the resulting foamed beads is in the form close to a sphere as much as possible. A group of foamed beads wide in a variation of apparent density may be subjected to a treatment such as screening to provide a group of foamed beads narrow in a variation of apparent density. If screening is conducted to provide a group of foamed beads narrow in a variation of apparent density, however, the prescribed effect cannot be achieved on the resulting molded article unless the average number of cells at the section of the foamed bead is within a range of 5 to 100 cells/mm$^2$.

The same various additives as those added to the conventional resin particles for expansion, such as antioxidants, antistatic agents, conductivity-imparting agents, weather resistance-imparting agents, pigments and lubricants, may be added to the resin particles used in the expansion. In the case where the resin particles are formed by, for example, the extruded strand cutting system, these additives may be contained into the resin articles by adding them to a molten resin in an extruder and kneading the resultant mixture.

The foamed beads of the propylene resin used for obtaining the molded article according to the present invention, which are narrow in a variation of apparent density and have the specific number of cells, can be obtained by using, for example, the resin particles formed in the above-described manner, which are narrow in a variation of weight, in accordance with a process comprising dispersing the resin particles in a dispersion medium such as water in a pressure vessel, impregnating the resin particles with a foaming agent while heating and stirring the dispersion in the presence of the foaming agent, and then releasing the resin particles and the dispersion medium from the vessel under a pressure lower than the internal pressure of the vessel at a temperature not lower than the softening temperature of the resin particles, thereby expanding the resin particles.

The kind and added amount of the foaming agent used for expanding the resin particles affect the density and variation of density of the resulting foamed beads. When a volatile foaming agent high in expanding power or a foaming agent composed mainly of a volatile foaming agent is used as the foaming agent, only foamed beads wide in variations of density and cell diameter can be obtained even if the amount of the foaming agent is reduced. Any good molded article cannot be provided from such foamed beads. Accordingly, in order to obtain a group of foamed beads which have a specific average density selected from apparent densities within the range of 0.18 to 0.64 g/cm$^3$ (the average apparent density of the group of foamed beads may be lower than 0.18 g/cm$^3$ when the foamed beads are compressed upon heating and molding thereof), and are narrow in a variation of apparent density among the foamed beads, an inorganic gas type foaming agent (hereinafter referred to as "inorganic foaming agent") such as an inorganic gas or a mixture of an inorganic gas and water or the like is used. Examples of the inorganic gas include air, nitrogen, carbon dioxide, argon, hydrogen and helium. Of these, air and nitrogen are preferred in view of the stabilization of density of the resulting foamed beads, burden imposed on the environment, cost and the like. As water used as the foaming agent, there may be utilized, for example, water used as the dispersion medium dispersing the resin particles therein upon the expansion of the resin particles. In order to positively utilize water as the foaming agent, resin particles containing a water-absorbing resin may also be used.

The inorganic foaming agent is preferably fed to a vessel in such a manner that the pressure of space within the vessel amounts to 1 to 30 kgf/cm$^2$(G), preferably 3 to 15 kgf/cm$^2$ (G). The inorganic foaming agent is fed into the vessel, for example, a closed vessel in which the resin particles are dispersed in water, and then held under heat while stirring the contents, whereby the resin particles can be impregnated with the foaming agent. In order to prevent a variation of density among the resulting foamed beads, the temperature and pressure within the vessel during the release of the resin particles from the vessel in the expanding step of the resin particles are preferably kept the same as the time the release of the resin particles has been started.

In order to narrow the variation of cell diameter among the foamed beads, it is also effective to add a foam stabilizer to the resin particles. Either an inorganic foam stabilizer or an organic foam stabilizer may be used as the foam stabilizer. Examples of the inorganic foam stabilizer include metal salts of boric acid, such as zinc borate, magnesium borate and borax, sodium chloride, aluminum hydroxide, talc, zeolite, silica and other inorganic substances which exhibit water-solubility of at least 0.1 g in 100 g of water at 80° C. Examples of the organic foam stabilizer include sodium 2,2-methylenebis(4,6-tert-butylphenyl) phosphate, sodium benzoate, calcium benzoate, aluminum benzoate and sodium stearate. These foam stabilizers may be used in any combination thereof.

Examples of the zinc borate include zinc metaborate [Zn(BO$_2$)$_2$], basic zinc borate [ZnB$_4$O$_7$.2ZnO] and those represented by chemical formulae of 2ZnO.3B$_2$O$_3$.3.5H$_2$O, 3ZnO.2B$_2$O$_3$.5H$_2$O and the like.

Examples of the magnesium borate include magnesium orthoborate [Mg$_3$(BO$_3$)$_2$], magnesium diborate, magnesium pyroborate [Mg$_2$B$_2$O$_5$ or 2MgO.B$_2$O$_3$], magnesium metaborate [MgO.B$_2$O$_3$], trimagnesium tetraborate [Mg$_3$B$_4$O$_9$ or 3MgO.2B$_2$O$_3$], pentamagnesium tetraborate [Mg$_5$B$_4$O$_{11}$], magnesium hexaborate [MgB$_6$O$_{10}$] and those represented by chemical formulae of 2MgO.3B$_2$O$_3$.nH$_2$O (wherein n is a positive integer), MgO.4B$_2$O$_3$.3H$_2$O, MgO.6B$_2$O$_3$.18H$_2$O and the like.

Another method for controlling the cell diameter of the foamed beads includes a method in which the structure of a discharge valve used in releasing the resin particles from the closed vessel is devised.

Of the above-mentioned foam stabilizers, the metal salts of boric acid, particularly, zinc borate, and sodium 2,2-methylene-bis(4,6-tert-butylphenyl) phosphate are preferred.

The amount of the foam stabilizer added is an important factor for preventing the formation of large cells and varied cells in size in the foamed beads used for obtaining the molded article according to the present invention. In the present invention, it is preferred to add the foam stabilizer within a range of 0.002 to 0.5 wt. %.

It is only necessary to add the foam stabilizer together with other additives to a molten resin in an extruder upon the formation of the resin particles by the extruded strand cutting system. Incidentally, in order to uniformly disperse the foam stabilizer and the various additive described above in the resin particles upon the addition of these additives into the resin particles, it is preferred to use a masterbatching process comprising preparing a master batch containing these additive at high concentrations and melting and kneading this master batch together with a base resin of the resin particles in an extruder.

An anti-fusing agent may be added to the dispersion medium upon dispersing the resin particles in the dispersion medium in the closed vessel for the purpose of preventing fusion bonding among the resin particles by heating upon expansion of the resin particles. Any anti-fusing agent may be used as such an anti-fusing agent, irrespective of organic and inorganic agents so far as it neither dissolves in the dispersion medium nor melts upon heating. However, an inorganic anti-fusing agents is generally used. Examples of the inorganic anti-fusing agent include mica, kaolin, talc, tricalcium phosphate, magnesium carbonate, zinc carbonate, aluminum oxide, titanium oxide and aluminum hydroxide. It is preferred that the anti-fusing agent be added into the dispersion medium in a proportion of 0.1 to 2 parts by weight per 100 parts by weight of the resin particles dispersed in the dispersion medium.

When the anti-fusing agent is used, an anionic surfactant such as sodium dodecylbenzenesulfonate or sodium oleate, a strong acid such as sulfuric acid, hydrochloric acid or nitric acid, or a strong acid salt or a hydrated strong acid salt, such as aluminum sulfate, magnesium chloride or calcium sulfate, is preferably added as a dispersion aid to the dispersion medium. It is preferred that the dispersion aid be added in the dispersion medium in a proportion of about 0.0001–0.2 parts by weight per 100 parts by weight of the resin particles.

Since the mutual fusion bonding property among the resultant foamed beads upon molding thereof is inhibited if the anti-fusing agent attaches to the surfaces of the foamed beads, the amount of the anti-fusing agent attached is controlled to less than 0.7 g, preferably less than 0.5 g, more preferably less than 0.2 g per 100 g of the foamed beads when a silicate mineral, for example, talc, mica, kaolin or the like, is used as the anti-fusing agent.

A preferable combination of the anti-fusing agent and the dispersion aid is such that the anti-fusing agent is a silicate mineral, and the dispersion aid is a mixture of a strong acid salt or a hydrated strong acid salt and anionic surfactant. In this case, a ratio of the silicate mineral to the strong acid salt or hydrated strong acid salt is preferably 50:1 to 15:1 by weight. This combination permits reducing the amount of the anti-fusing agent attached to the surfaces of the foamed beads and omitting a step of removing the anti-fusing agent attached to the surfaces of the foamed beads, such as washing with an acid solution, alkaline solution, hot water, an aqueous solution of a surfactant, or the like.

The foamed beads obtained in the above-described manner are preferably such that the quantity of heat at an endothermic peak on the higher-temperature side (hereinafter referred to as the "high-temperature peak") on a DSC curve obtained by the differential scanning calorimetry of the foamed beads is 3 to 20 J/g. In the process of obtaining the foamed beads, the heating rate, or the holding temperature and holding time before the expansion can be controlled, thereby obtaining foamed beads whose quantity of heat at the high-temperature peak is within the range of 3 to 20 J/g. The degrees of expandability, fusion bonding property and the like upon molding of the foamed beads in a mold can be controlled by controlling the quantity of heat at the high-temperature peak of the foamed beads. The expandability and fusion bonding property of the foamed beads having a low expansion ratio, in which the average number of cells at the section of the foamed bead have been controlled, can be further improved by this control, and so an expansion-molded article, which has a low expansion ratio and is far excellent in mutual fusion bonding property among the foamed beads and appearance, can be provided.

The foamed beads obtained in the above-described manner are aged under atmospheric pressure and then filled into a mold or the like to heat and mold them with heated steam or the like, whereby an expansion-molded article can be obtained. As needed, the foamed beads are subjected to a pressurizing treatment prior to their filling into the mold to increase the internal pressure of the beads. The pressurizing treatment is generally conducted by pressurizing the foamed beads with air in a pressure tank. However, foamed beads whose quantity of heat at the high-temperature peak on the DSC curve is 3 to 15 J/g can provide an expansion-molded article according to the present invention, which has excellent physical properties, even when they are molded without subjecting them to the pressurizing treatment. In particular, in order to make the foamed beads having an apparent density of at least 0.18 g/cm$^3$, preferably at least 0.24 g/cm$^3$ moldable without subjecting them to the pressurizing treatment, it is preferred that the quantity of heat at the high-temperature peak be 3 to 13 J/g, preferably 3 to 11 J/g. Incidentally, the quantity of heat at the high-temperature peak scarcely varies upon molding the foamed beads by heating and molding means to obtain a molded article. Accordingly, the quantity of heat at the high-temperature peak of an expansion-molded article obtained from the foamed beads whose quantity of heat at the high-temperature peak is 3 to 20 J/g also amounts to 3 to 20 J/g.

The quantity of heat at the high-temperature peak of the foamed beads or the expansion-molded article corresponds to an area of a high-temperature peak b on a DSC curve illustrated in FIG. 1 obtained by heating 1 to 8 mg of a sample of the foamed beads or expansion-molded article up to 220° C. at a heating rate of 10° C./min by a differential scanning calorimeter. The quantity of heat can be determined in the following manner. Namely, as shown in FIG. 1, a straight line is first drawn between a point I at 80° C. on the DSC curve and a point II on the DSC curve, which indicates the melting completion temperature of the base resin. A straight line perpendicular to the abscissa axis (Temperature) of the graph is then drawn through a point III on the DSC curve, which corresponds to a valley between an inherent endothermic peak a corresponding to the endotherm of the base resin upon melting and the high-temperature peak b, to the straight line connecting the point I and the point II. The intersection thereof is regarded as a point IV. The quantity of heat at the high-temperature peak b corresponds to an area of a section (a hatched section) surrounded by a straight line connecting the point IV thus obtained and the point II, a straight line connecting the point III and the point IV, and a DSC curve between the point III and the point II.

As a method for filling foamed beads into a mold when molding the foamed beads by means of the mold, there is known the so-called cracking filling method in which foamed beads are filled into a mold in a state that a slight crack has been provided in the mold, and the mold is then completely closed. When the usual cracking filling method is adopted upon filling foamed beads having a low expansion ratio into a mold, however, there is a possibility that the life of the mold may be shortened due to the compressive stiffness of the foamed beads. Therefore, when such foamed beads are molded in the mold, it is preferred that the mold be completely closed after filling the foamed beads into the mold with a crack provided therein, and then feeding steam to the mold to conduct purging.

Incidentally, the expansion-molded article according to the present invention can be obtained by molding the foamed beads by means of any known heating and molding means such as a combination mold composed of a female mold and a male mold, or a continuous molding apparatus making use of such a conveyer type mold as described in Japanese Patent Application Laid-Open No. 104026/1997.

The thus-obtained expansion-molded article of the propylene resin according to the present invention features that its apparent density is 0.11 to 0.45 g/cm$^3$, preferably 0.125 to 0.3 g/cm$^3$, more preferably 0.15 to 0.3 g/cm$^3$, a value obtained by dividing its maximum bending strength (kgf/cm$^2$) determined in accordance with JIS K 7221 by the apparent density (g/cm$^3$) is at least 155 (kgf/cm$^2$)/(g/cm$^3$), and the average number of cells at its section is within a range of 5 to 100 cells/mm$^2$, preferably 10 to 70 cells/mm$^2$.

It is particularly preferred that the molded article be excellent in impact resistance as demonstrated by an Izod impact value of at least 1 (kgf·cm/cm$^2$) as determined in accordance with JIS K 7110.

If the ratio of the bending strength to the density in the molded article is lower than 155 gf/cm$^2$)(g/cm$^3$), it cannot be said that the strength of the molded article is sufficient, and so such a molded article is difficult to use as a thin-wall molded article in particular. In the present invention, the ratio of the bending strength to the density is preferably at least 180 (kgf/cm$^2$)/(g/cm$^3$), particularly preferably at least 200 (kgf/cm$^2$)/(g/cm$^3$). In the molded article according to the present invention, the ratio of the bending strength to the density of at least 155 (kgf/cm$^2$)/(g/cm$^3$) gives an index to the fact that the mutual fusion bonding property among the foamed beads forming the molded article is good. Such a molded article can be said to be superior to the conventional one from the viewpoint of physical properties of the molded article having a low expansion ratio, such as stiffness.

If the average number of cells at the section of the expansion-molded article is less than 5 cells/mm$^2$, such a molded article becomes poor in physical properties such as bending strength. This fact is considered to be caused by defective expansion of and defective fusion bonding among the foamed beads upon molding thereof. If the average number of cells at the section of the molded article exceeds 100 cells/mm$^2$, such a molded article becomes poor in dimensional stability. This fact is considered to be caused by too high expandability of the foamed beads and insufficient structural strength of the foamed beads due to the too thin cell membranes forming the cells in the foamed bead.

The Izod impact value correlates to the quality of the appearance on the surface of the molded article and to whether the fusion bonding property among the foamed beads is good or not. A molded article having impact strength as high as at least 1 (kgf·cm/cm$^2$), preferably at least 1.2 (kgf·cm/cm$^2$) in terms of an Izod impact value is little in voids on the surface thereof and hence has good appearance and also good mutual fusion bonding property among the foamed beads.

The molded article according to the present invention is also excellent in stiffness represented by compressive strength and is so good that it does not crack even in compressive strength measuring tests at 5% strain and 10% strain. The molded article preferably has compressive strength at 5% strain of at least 8 kgf/cm$^2$, more preferably at least 15 kgf/cm$^2$, most preferably at least 20 kgf/cm$^2$, and compressive strength at 10% strain of at least 10 kgf/cm$^2$, more preferably at least 20 kgf/cm$^2$, most preferably at least 25 kgf/cm$^2$.

The measuring methods of various physical properties of foamed beads and molded articles thereof in the present specification will hereinafter be described.

The maximum bending strength of a molded article is a value determined in accordance with JIS K 7221. Incidentally, as a sample for measuring the maximum bending strength, a molded article sample, which has no surface (skin) and the size is 25 mm in width, 20 mm in height and not smaller than 120 mm in length, is used. As the density upon determining the ratio of the bending strength to the density, apparent density of the molded article sample whose maximum bending strength will be determined is used. The ratio of the bending strength to the density is determined by conducting the measurement on 10 samples to find the arithmetic mean thereof.

The apparent density of foamed beads is determined in accordance with the following equation (1) by sampling about 5,000 foamed beads from a group of foamed beads, leaving them to stand for 24 hours under conditions of 23° C. in temperature and 50% in relative humidity, measuring the weight, W (g) of the foamed bead sample, and sinking the sample into ethanol at 23° C. in a graduated cylinder to find a true volume, L (cm$^3$) of the sample from the rise in methanol level.

[Apparent density (g/cm$^3$) of the sample of the foamed bead group]=W÷L   (1)

The apparent density of an expansion-molded article can be determined by leaving an expansion-molded article sample having a volume of at least 50 cm$^3$ to stand for 24 hours under conditions of 23° C. in temperature and 50% in relative humidity, and then dividing the weight, W (g) of the expansion-molded article sample by a volume (cm$^3$) calculated out from the outside dimension of the molded article sample.

In order to find the standard deviation of the apparent density of foamed beads, a group of foamed beads left to stand for 24 hours under conditions of 23° C. in temperature and 50% in relative humidity is first screened by screens prescribed in Attached Table 2 of JIS Z 8801 (1994) to determine an apparent density (g/cm$^3$) of a group of foamed beads on each screen. On the other hand, the number of foamed beads on each screen is counted, thereby finding the standard deviation of the apparent density of the foamed beads from the apparent densities of the groups of the foamed beads on the respective screens and the numbers of the foamed beads on the respective screens.

On the other hand, the average number of cells at the section of a foamed bead is determined through a scanning electron microscope. More specifically, each of at least 10 foamed beads selected at random from a group of foamed beads left to stand for 24 hours under conditions of 23° C. in temperature and 50% in relative humidity is cut into halves by a sharp cutter, and the section of each cut piece is subjected to a pretreatment by vapor deposition with gold to prepare each specimen. An enlarged photograph of the section of the specimen is then taken by the scanning electron microscope to count the number of cells present within a region corresponding to a square of 1 mm in length and 1 mm in breadth about the center of the section, thereby finding the number of cells per mm$^2$. The arithmetic mean of the values found on the respective specimens is regarded as the average number of cells. Incidentally, cells intersected by the upper side and the right side of the square of 1 mm in length and 1 mm in breadth are not counted. The average number of cells at the section of an expansion-molded article can be determined by the same method as the measuring method of the average number of cells at the section of the foamed bead except that 10 specimens each having a size of 5 mm in length and 5 mm in breadth are cut out of an expansion-molded article sample left to stand for 24 hours under conditions of 23° C. in temperature and 50% in relative humidity, and the number of cells present about the center of the section of an optional foamed bead making up the section of each specimen are counted. In the present invention, the number of cells in a part of the section of the expansion-molded article or several percent of foamed beads in the whole group of the foamed beads may be outside the range of 5 to 100 cells/mm$^2$ so far as the average number of cells in the specimens as determined in the above-described manner is within a range of 5 to 100 cells/mm$^2$.

The Izod impact value (kg cm/cm$^2$) of an expansion-molded article is determined as to a specimen having a size of 80 mm in length, 10 mm in thickness and 10 mm in width (no notch is provided in the specimen). When the specimen is cut out of an expansion-molded article sample of a propylene resin, a specimen having the surface of the molded article is cut out in such a manner that the surface 80 mm long and 10 mm wide in the specimen corresponds to the surface of the molded article. The Izod value is determined by using this specimen to give percussion to the specimen on the side having the molded article surface under conditions of 23° C. and 50% relative humidity in accordance with JIS K 7110 by means of an impact testing machine having fundamental performance that the weighing capacity is 11 J, the percussion speed is 3.5 m/sec, the mass of the hammer is 0.784 kg, the distance between the center line of the axis of rotation of the hammer and the center of gravity of the hammer is 6.85 cm, the angle to be raised of the hammer corresponding to the weighing capacity is 150°, and the distance between the center line of the axis of rotation of the hammer and the blade edge is 30.7 cm.

In the measurements of compressive strength (kgf/cm$^2$) at 10% strain and compressive strength (kgf/cm$^2$) at 5% strain, specimens having no surface of the molded article and a size of 50 mm in length, 50 mm in width and 25 mm in height are prepared by cutting them out of an expansion-molded article sample of a propylene resin. Each compressive strength is calculated out on the basis of a value obtained by using such a specimen and compressing it in the height direction thereof under conditions of 23° C., 50% relative humidity and a compression rate of 10 mm/min in accordance with JIS K 7220.

The present invention will hereinafter be described in more detail by the following Examples.

EXAMPLES 1 to 8, AND COMPARATIVE EXAMPLES 1 AND 2

After their corresponding foam stabilizers shown in Table 1 were separately added to an ethylene-propylene random copolymer (ethylene content: 2.4 wt. %; molting point: 146° C.; MI: 10 g/10 min) containing 0.12 wt. % of an antioxidant, 0.05 wt. % of calcium stearate (lubricant), 0.05 wt. % of erucic acid amide (lubricant) and 0.2 wt. % of a weather resistance-imparting agent, and each of the resultant mixtures was melted and kneaded in an extruder, the melt was extruded from a die installed on the tip of the extruder into a strand. The strand was cut in such a manner that a ratio of the diameter to the length in the resulting foamed beads will be substantially 1.0, thereby obtaining resin particles having its corresponding average weight shown in Table 1. Incidentally, the foam stabilizer was added in the form of a master batch so as to amount to its corresponding quantity shown in Table 1.

A 400-liter autoclave was then charged with 100 parts by weight of the thus-obtained resin particles, 500 parts by weight of water, 1 part by weight of tricalcium phosphate and 0.08 parts by weight of a surfactant (sodium dodecylbenzenesulfonate). While stirring the contents, they were held for 15 minutes at a temperature lower than its corresponding foaming temperature shown in Table 1 by 5° C. In the meantime, nitrogen gas was fed into the autoclave to control the pressure within the autoclave so as to reach a pressure lower than its corresponding target pressure within the autoclave upon expansion shown in Table 1 by 1 kgf/cm$^2$(G). The contents were then heated to the foaming temperature and held for 15 minutes at the same temperature. In the meantime, additional nitrogen gas was fed into the autoclave so as to reach the target pressure within the autoclave upon expansion. Thereafter, the autoclave was opened at one end thereof to release the resin particles through an orifice 16 mm in diameter and 50 mm in length (in Examples 6 and 8, no orifice was used to directly release the resin particles through a needle valve) under atmospheric pressure to obtain foamed beads according to each example. Incidentally, the expansion was conducted while feeding nitrogen gas into the autoclave so as to keep the pressure within the autoclave at the target pressure within the autoclave upon the expansion during the release of the resin particles from the autoclave.

After removing water attached to the surfaces of the resultant foamed beads, they were left to stand for 24 hours under atmospheric pressure to age them, and were then fully washed with 0.1N hydrochloric acid and dried. The apparent density, standard deviation of apparent density and average number of cells of the foamed beads in this group of foamed beads etc. were determined. The results are shown in Table 1. The foamed beads were then filled without subjecting them to a pressurizing treatment (only in Example 4, the pressurizing treatment was conducted to apply an internal pressure of 2.0 kg/cm$^2$; in this example, the pressurizing treatment was conducted by holding the foamed beads for 12 hours in a pressurizing tank kept at an internal pressure of 2.0 kg/cm$^2$ and an internal temperature of 30° C.) into a mold having a mold cavity of 250 mm×200 mm×50 mm in a state that a slight crack had been provided without completely closing the mold. After the interior of the mold was then purged with steam, the mold was completely closed to heat and mold the foamed beads with steam of its corresponding steam pressure shown in Table 2. After the molding, the mold was cooled with water until the pressure of the surface of the mold pressed by the resultant molded article within the mold was reduced to 0.6 kgf/cm$^2$(G), and the resultant molded article was then taken out of the mold. The molded article was aged at 60° C. for 24 hours and then cooled to room temperature. The various physical properties of this molded article were determined. The results are shown collectively in Table 2.

EXAMPLES 9 AND 10

An autoclave was then charged with 100 parts by weight of the same resin particles as those used in Example 1 except that a ratio of the diameter to the length in the resulting foamed beads will be substantially 2.0, 220 parts by weight of water, 0.5 parts by weight of kaolin as an anti-fusing agent, 0.015 parts by weight of hydrated aluminum sulfate as a dispersion aid and 0.007 parts by weight of sodium dodecylbenzenesulfonate to obtain foamed beads according to each example in the same manner as in Example 1 except that its corresponding foaming temperature and target pressure within the autoclave shown in Table 1 were used. An expansion-molded article was then obtained in the same manner as in Example 1 except that the resultant foamed beads were used without washing with an acid, and the molding was conducted under its corresponding conditions shown in Table 2. Incidentally, the foamed beads obtained in Examples 9 and 10 had average cell diameters of 20 μm and 15 μm, respectively, in the surface layer portions within a range of from the surface of the bead to 100 μm, and average cell diameters of 250 μm and 200 μm, respectively, in the inner layer portion thereof. The various physical properties of the molded articles were determined. The results are shown collectively in Table 2.

TABLE 1

| | Example | | | | | | | | | | Comp. Example | |
|---|---|---|---|---|---|---|---|---|---|---|---|---|
| | 1 | 2 | 3 | 4 | 5 | 6 | 7 | 8 | 9 | 10 | 1 | 2 |
| Average weight (mg) | 0.8 | 0.8 | 0.8 | 1.8 | 1.8 | 1.8 | 1.8 | 1.8 | 2.0 | 2.0 | 0.8 | 0.8 |
| Foam stabilizer | | | | | | | | | | | | |
| Kind | Zinc borate | Zinc borate | Zinc borate | Zinc borate | Zinc borate | Zinc borate | Zinc borate | Aluminum hydroxide | Zinc borate | Zinc borate | Zinc borate | Zinc borate |
| Amount added (wt. %) | 0.005 | 0.005 | 0.005 | 0.005 | 0.005 | 0.005 | 0.005 | 0.05 | 0.02 | 0.03 | 0.001 | 0.005 |
| Foaming temp. (° C.) | 156.0 | 157.0 | 157.5 | 155.0 | 156.6 | 157.5 | 158.5 | 157.0 | 157.0 | 156.5 | 158.0 | 153.0 |
| Target pressure within autoclave [kgf/cm$^2$(G)] | 15.0 | 15.0 | 15.0 | 20.0 | 15.0 | 15.0 | 15.0 | 15.0 | 7.0 | 8.5 | 10.0 | 40.0 |
| Apparent density (g/cm$^3$) | 0.53 | 0.51 | 0.48 | 0.50 | 0.39 | 0.30 | 0.55 | 0.31 | 0.22 | 0.18 | 0.69 | 0.31 |
| Standard deviation of apparent density (g/cm$^3$) | 0.008 | 0.006 | 0.011 | 0.013 | 0.011 | 0.047 | 0.012 | 0.078 | 0.030 | 0.038 | 0.031 | 0.020 |
| Average number of cells (cells/mm$^2$) | 24 | 35 | 14 | 22 | 20 | 18 | 5 | 16 | 30 | 30 | 3 | 40 |
| Average cell diameter ($\mu$m) | 200 | 150 | 300 | 200 | 250 | 250 | 500 | 250 | 150 | 180 | 600 | 100 |
| Quantity of heat at high-temperate peak (J/g) | 13.3 | 9.8 | 9.0 | 18.8 | 10.7 | 9.0 | 4.4 | 9.8 | 8.8 | 13.3 | 7.9 | 28.0 |

TABLE 2

| | Example | | | | | | | | | | Comp. Example | |
|---|---|---|---|---|---|---|---|---|---|---|---|---|
| | 1 | 2 | 3 | 4 | 5 | 6 | 7 | 8 | 9 | 10 | 1 | 2 |
| Pressurizing treatment of foamed beads | Not conducted | Not conducted | Not conducted | Conducted | Not conducted | Not conducted | Not conducted | Not conducted | Not conducted | Not conducted | Not conducted | Not conducted |
| Steam pressure [kgf/cm$^2$(G)] | 4.0 | 3.6 | 3.6 | 4.0 | 3.8 | 3.4 | 3.4 | 3.6 | 3.4 | 3.8 | 4.0 | 4.0 |
| Quantity of heat at high-temperate peak (J/g) | 13.0 | 10.0 | 8.8 | 18.5 | 10.9 | 9.2 | 4.3 | 10.0 | 9.0 | 13.5 | 7.9 | 27.5 |
| Average number of cells (cells/mm$^2$) | 21 | 30 | 12 | 19 | 17 | 15 | 4 | 15 | 38 | 35 | 3 | 38 |
| Appearance | ○ | ○ | ○ | ○ | ○ | ○ | ○ | Δ | ○ | ○ | X | X |
| Apparent Density (g/cm$^3$) | 0.42 | 0.41 | 0.39 | 0.39 | 0.32 | 0.21 | 0.41 | 0.24 | 0.15 | 0.13 | 0.46 | 0.30 |
| Ratio of bending strength to apparent density (kgf/cm$^2$)/(g/cm$^3$) | 210 | 210 | 220 | 230 | 250 | 210 | 200 | 190 | 210 | 200 | 150 | 100 |
| Izod impact value (kgf · cm/cm$^2$) | 1.2 | 1.2 | 1.3 | 1.6 | 2.0 | 1.6 | 1.1 | 0.9 | 1.5 | 1.5 | 0.5 | 0.5 |
| Compressive strength at 5% strain (kgf/cm$^2$) | 71 | 67 | 61 | 61 | 44 | 23 | 67 | 27 | 12 | 11 | 83 | Cracked |
| Compressive strength at 10% strain (kgf/cm$^2$) | 96 | 92 | 83 | 83 | 55 | 26 | 92 | 32 | 14 | 13 | 115 | Cracked |

The expansion-molded articles obtained in Examples 1 to 10 were of good quality in that they had no variation of density and were excellent in mechanical strength such as bending strength. Incidentally, the properties of the expansion-molded articles shown in Table 2 were evaluated in the following manner:

(1) Appearance of Expansion-molded Article:

The appearance of an expansion-molded article sample was visually observed to evaluate it in accordance with the following standard:

○: No void was present among foamed beads in the surface of the molded article, and its surface was smooth;

Δ: Some voids were present among foamed beads in the surface of the molded article, but its surface was smooth;

X: Voids were present, and shrinkage occurred.

(2) Ratio of Bending Strength to Apparent Density:

A specimen having a size of 150 mm×200 mm×25 mm was cut out of a molded article sample to determine its maximum bending strength by using a wedge having a radius, r of 5 mm under conditions of a testing speed of 10 mm/min and a distance between support points of 100 mm in accordance with JIS K 7221. The ratio was found by dividing this value by the apparent density of the specimen.
(3) Apparent density of molded article:

A specimen having a size of 50 mm×50 mm×25 mm was cut out of a molded article sample and left to stand for 24 hours under conditions of 23° C. in temperature and 50% in relative humidity. The outside dimension of the specimen was measured by calipers to calculate out its volume ($cm^3$). The density of the molded article was calculated out by dividing the weight (g) of the specimen by the volume ($cm^3$) of the specimen.

EXAMPLE 11

An expansion-molded article was obtained in the same manner as in Example 9 except that the dispersion aid used in obtaining the foamed beads was changed from 0.015 parts by weight of hydrated aluminum sulfate to 0.023 parts by weight of hydrated magnesium chloride. The thus-obtained foamed beads and expansion-molded article thereof had substantially the same physical properties as those obtained in Example 9.

EXAMPLE 12

An expansion-molded article was obtained in the same manner as in Example 9 except that the dispersion aid used in obtaining the foamed beads was changed from 0.015 parts by weight of hydrated aluminum sulfate to 0.011 parts by weight of hydrated aluminum chloride. The thus-obtained foamed beads and expansion-molded article thereof had substantially the same physical properties as those obtained in Example 9.

According to the expansion-molded articles of the propylene resins according to the present invention, as described above, the problem of deteriorated appearance involved in the conventional expansion-molded articles having a low expansion ratio and the problem that the stiffness-improving effect attendant on the formation of an expansion-molded article having a low expansion ratio cannot be fully achieved can be solved. These molded articles are excellent in both appearance and physical properties such as stiffness.

What is claimed is:

1. A molded article of foamed and expanded beads of a propylene resin, which is obtained by heating and molding the foamed beads of the propylene resin, wherein the apparent density of the molded article is 0.11 to 0.45 $g/cm^3$, a value obtained by dividing its maximum bending strength ($kgf/cm^2$) by the apparent density ($g/cm^3$) is at least 155 ($kgf/cm^2$)/($g/cm^3$), and the average number of cells at its section is within a range of 5 to 100 cells/$mm^2$.

2. The molded article according to claim 1, wherein the value obtained by dividing the maximum bending strength ($kgf/cm^2$) by the apparent density ($g/cm^3$) is at least 180 ($kgf/cm^2$)/($g/cm^3$).

3. The molded article according to claim 1, wherein the value obtained by dividing the maximum bending strength ($kgf/cm^2$) by the apparent density ($g/cm^3$) is at least 200 ($kgf/cm^2$)/($g/cm^3$).

4. The molded article according to claim 1, which has an Izod impact value of at least 1 ($kgf\ cm/cm^2$).

5. The molded article according to claim 1, wherein a propylene resin comprising 0.002 to 0.5 wt. % of an inorganic or organic foam stabilizer is used as a base resin.

6. The molded article according to claim 5, wherein the foam stabilizer is at least one selected from the group consisting of zinc borate and sodium 2,2-methylenebis(4,6-tert-butylphenyl) phosphate.

7. The molded article according to claim 1, wherein the quantity of heat at an endothermic peak on the higher-temperature side on a DSC curve obtained by the differential scanning calorimetry of the molded article is 3 to 20 J/g.

8. The molded article according to claim 1, wherein the quantity of heat at an endothermic peak on the higher-temperature side on a DSC curve obtained by the differential scanning calorimetry of the molded article is 3 to 15 J/g.

9. The molded article according to claim 1, wherein the quantity of heat at an endothermic peak on the higher-temperature side on a DSC curve obtained by the differential scanning calorimetry of the molded article is 3 to 13 J/g.

10. The molded article according to claim 1, wherein the quantity of heat at an endothermic peak on the higher-temperature side on a DSC curve obtained by the differential scanning calorimetry of the molded article is 3 to 11 J/g.

11. The molded article according to claim 4, wherein a propylene resin comprising 0.002 to 0.5 wt. % of an inorganic or organic foam stabilizer is used as a base resin.

12. The molded article according to claim 11, wherein the foam stabilizer is at least one of zinc borate and sodium 2,2-methylenebis(4,6-tert-butylphenyl)phosphate.

13. The molded article according to claim 4, wherein the quantity of heat at an endothermic peak on the higher-temperature side on a DSC curve obtained by the differential scanning calorimetry of the molded article is 3 to 20 J/g.

14. The molded article according to claim 5, wherein the quantity of heat at an endothermic peak on the higher-temperature side on a DSC curve obtained by the differential scanning calorimetry of the molded article is 3 to 20 J/g.

15. The molded article according to claim 6, wherein the quantity of heat at an endothermic peak on the higher-temperature side on a DSC curve obtained by the differential scanning calorimetry of the molded article is 3 to 20 J/g.

* * * * *